US009471573B2

(12) United States Patent
Faenger et al.

(10) Patent No.: US 9,471,573 B2
(45) Date of Patent: *Oct. 18, 2016

(54) USER PREFERENCE BASED COLLECTING OF MUSIC CONTENT

(75) Inventors: Jens Faenger, Santa Clara, CA (US); Stefan Knopp, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 1077 days.

This patent is subject to a terminal disclaimer.

(21) Appl. No.: 13/548,235

(22) Filed: Jul. 13, 2012

(65) Prior Publication Data

US 2012/0278715 A1   Nov. 1, 2012

Related U.S. Application Data

(63) Continuation of application No. 12/709,927, filed on Feb. 22, 2010, now Pat. No. 8,225,206.

(51) Int. Cl.
*G06F 17/30* (2006.01)

(52) U.S. Cl.
CPC ... *G06F 17/30053* (2013.01); *G06F 17/30029* (2013.01)

(58) Field of Classification Search
CPC .............. G06F 17/30029; G06F 17/30053
See application file for complete search history.

(56) References Cited

U.S. PATENT DOCUMENTS

| | | | | |
|---|---|---|---|---|
| 6,438,579 | B1 * | 8/2002 | Hosken | G06F 17/30867 707/999.002 |
| 7,653,761 | B2 * | 1/2010 | Juster | H04N 21/4825 386/291 |
| 7,672,873 | B2 * | 3/2010 | Kindig | G06Q 30/02 705/26.1 |
| 8,046,435 | B1 * | 10/2011 | Parekh | G06F 15/0291 709/219 |
| 2003/0167288 | A1 * | 9/2003 | Iguchi | G06F 3/0605 |
| 2005/0240661 | A1 * | 10/2005 | Heller | G06F 17/30029 709/219 |
| 2006/0179078 | A1 * | 8/2006 | McLean | G06F 17/30029 |
| 2006/0195516 | A1 * | 8/2006 | Beaupre | G06F 17/30766 709/203 |
| 2006/0218226 | A1 * | 9/2006 | Johnson | H04L 67/16 709/202 |
| 2007/0067429 | A1 * | 3/2007 | Jain | G06F 17/30029 709/223 |
| 2007/0078895 | A1 * | 4/2007 | Hsieh | G06F 17/30029 |
| 2007/0208771 | A1 * | 9/2007 | Platt | G06F 17/30038 |
| 2008/0059422 | A1 * | 3/2008 | Tenni | G06F 17/30029 |
| 2008/0065741 | A1 * | 3/2008 | Stratton | G06F 17/30029 709/217 |
| 2008/0077679 | A1 * | 3/2008 | Bawany | G06F 17/30053 709/220 |
| 2008/0133525 | A1 * | 6/2008 | Ott | G06F 17/30053 |
| 2008/0250067 | A1 * | 10/2008 | Svendsen | G06F 17/30029 |
| 2008/0263476 | A1 * | 10/2008 | Vignoli | G06F 17/30026 715/810 |
| 2009/0055377 | A1 * | 2/2009 | Hedge | G06F 17/30029 |
| 2009/0063975 | A1 * | 3/2009 | Bull | G06F 3/048 715/716 |
| 2009/0083141 | A1 * | 3/2009 | Craine | G06F 17/30029 705/14.69 |
| 2009/0119294 | A1 * | 5/2009 | Purdy | G06F 17/30029 |
| 2009/0327222 | A1 * | 12/2009 | Spitzer-Williams | G06F 17/30053 |
| 2010/0076958 | A1 * | 3/2010 | Gates | G06F 17/30053 707/722 |
| 2010/0179865 | A1 * | 7/2010 | Lundqvist | H04L 29/08729 705/14.4 |
| 2011/0154198 | A1 * | 6/2011 | Bachman | G06F 17/30026 715/704 |

* cited by examiner

*Primary Examiner* — Andrea Long
(74) *Attorney, Agent, or Firm* — Maginot Moore & Beck LLP

(57) ABSTRACT

A method of operating an entertainment system includes computer-implemented steps including determining an audio/video preference profile of the user. An item of audio/video content that fits the profile but that is not available to the system is identified. The identified item is wirelessly received from a source of audio/video content. The source is external to the entertainment system. The received item is stored in memory within the system. The stored item is retrieved from memory. The retrieved item is played back to a human user of the system.

4 Claims, 3 Drawing Sheets

USER PREFERENCE BASED COLLECTING OF MUSIC CONTENT

CROSS-REFERENCE TO RELATED APPLICATIONS/INCORPORATION BY REFERENCE

This application is a continuation of U.S. patent application Ser. No. 12/709,927 entitled "USER PREFERENCE BASED COLLECTING OF USER CONTENT", filed Feb. 22, 2010, the complete subject matter of which is hereby incorporated herein by reference, in its entirety.

BACKGROUND OF THE INVENTION

1. Field of the Invention

The present invention relates to entertainment systems, and, more particularly, to entertainment systems that can be personalized to a user's preferences.

2. Description of the Related Art

State of the art entertainment systems, mobile players and car radios, have access to two different kinds of sources: music locally stored in the device, e.g., in flash memory or on a hard drive, and music stored outside the device. Locally stored music usually resembles the music collection of a user or at least resembles parts of the collection. Music from outside the device might be received from temporarily-connected storage devices, FM/AM/XM and digital radio broadcast, internet streaming or other web services that offer music.

The amount of music stored in the entertainment device is naturally limited by the storage size available. New music has to be manually copied into the device memory. Some state of the art MP3 players such as the Apple iPod use the concept of "synchronization", wherein a number of manually- or automatically-selected songs from a larger collection is copied into the player's memory whenever the player is connected to a computer. Even though this kind of copying is more automated, it still requires the user to manually connect the player to an external device. Without the external device, the player or entertainment system does not receive new content. In contrast, music from external sources offers basically unlimited amounts of music and variety and the user does not have to worry about storage issues.

On the other hand, external music sources face a number of limitations. When playing radio broadcast or audio streaming, the order of songs is predetermined by the external source. In addition, an entertainment system can play a specific radio station only if the entertainment system is within the broadcast range of the radio station. Accessing music from the internet is possible only when there is a working internet connection. Access to music on external storage memory is possible only when the memory is present and connected to the entertainment system. In contrast, locally stored music does not face these limitations and is available to the system at all times.

If the user wants to listen to new music, he has different options. He could copy the new content into the entertainment system's memory himself by copying it from an external storage device. This requires him to remember to bring the external storage device into the proximity of the entertainment system. The user could listen to a radio station that potentially plays new songs he is interested in. However, this works only if the station is within the reception range of the entertainment system. He could listen to a personalized radio station on the internet, such as from Last.FM. A problem is that this works only if the internet connection is working. In mobile environments, it is very likely that the entertainment system will find itself in areas that have no mobile internet coverage.

In addition to the music itself, state of the art entertainment systems use meta information such as song name, artist or genre to identify and name the music that is present in the device. This information itself can be stored in the entertainment system. Embedded music databases such as from Gracenote contain information about thousands or even millions of songs. The larger the data base size, the higher the probability that information is found for all songs that are currently stored in the device. But a larger database increases the amount of storage space required. Still, even if the database is large, it does not cover songs that are more recent than the database itself. For this reason, some embedded music data bases allow an online update, i.e., the retrieval of a list of newly published songs. On the other hand, online music services make it possible to look up meta information for individual songs. While this removes the need for an embedded data base, it requires an internet connection. Thus, if the connection fails, then no information can be acquired.

What is neither disclosed nor suggested in the art is a personalized entertainment system that overcomes the problems and limitations described above.

SUMMARY OF THE INVENTION

The present invention provides an entertainment system that is able to detect the musical taste of the user. Based on the detected musical taste, the system may identify other music that might be of interest to the user and place such identified music into a "wishlist". The system of the invention may then monitor broadcast radio, streaming music and other music sources for the artists and songs in the wishlist and automatically record and store them within the device to thereby supplement the music collection that is already available in the device. In addition to recording, the invention may actively find and download music from online sources. The automatically recorded and downloaded music may enable the system to present to the user new and interesting music even when the original music sources are not accessible, thus performing a caching of content. In addition to caching the music content, the invention may also cache the meta information needed for identifying the similarities between songs present in the device. Compared to other approaches that require large data bases in the device, this approach may store information about only songs that are actually present, which drastically reduces the amount of storage required.

The invention comprises, in one form thereof, a method of operating an entertainment system in computer-implemented steps including determining an audio/video preference profile of a human user of the system. An item of audio/video content that fits the profile but that is not available to the system is identified. The identified item is wirelessly received from a source of audio/video content. The source is external to the entertainment system. The received item is stored in memory within the system. The stored item is retrieved from memory. The retrieved item is played back to the user.

The invention comprises, in another form thereof, a method of operating an entertainment system in computer-implemented steps including determining an audio/video preference profile of a human user of the system. A first item of audio/video content that fits the profile is identified. An identity of a second item of audio/video content is wirelessly received. The second item is similar to the first item but is not available to the system. The identity of the second item is received from an internet-based provider of audio/video similarity information. A request for the identified second item is wirelessly transmitted to a source of audio/video content. The source is external to the entertainment system. The identified second item is wirelessly received from the source of audio/video content. The received second item is stored in memory within the system and retrieved therefrom. The retrieved second item is played back to the user.

The invention comprises, in yet another form thereof, a method of operating an entertainment system in computer-implemented steps including determining an audio/video preference profile of a human user of the system. An item of audio/video content that fits the profile but that is not available to the system is identified. The user is informed of the identity of the item. The user is prompted to indicate whether he wants the system to purchase the item. If the user indicates that he does want the system to purchase the item, then the identified item is purchased and wirelessly received from a source of audio/video content. The source is external to the entertainment system. The received item is stored in memory within the system. The stored item is retrieved from memory and played back to the user.

An advantage of the present invention is that no internet connection is required during playback.

Another advantage is that no large and costly song knowledge data base is required in the device.

Yet another advantage is that songs that are of interest to the user may be identified, acquired, and played back to the user without any effort or action by the user.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
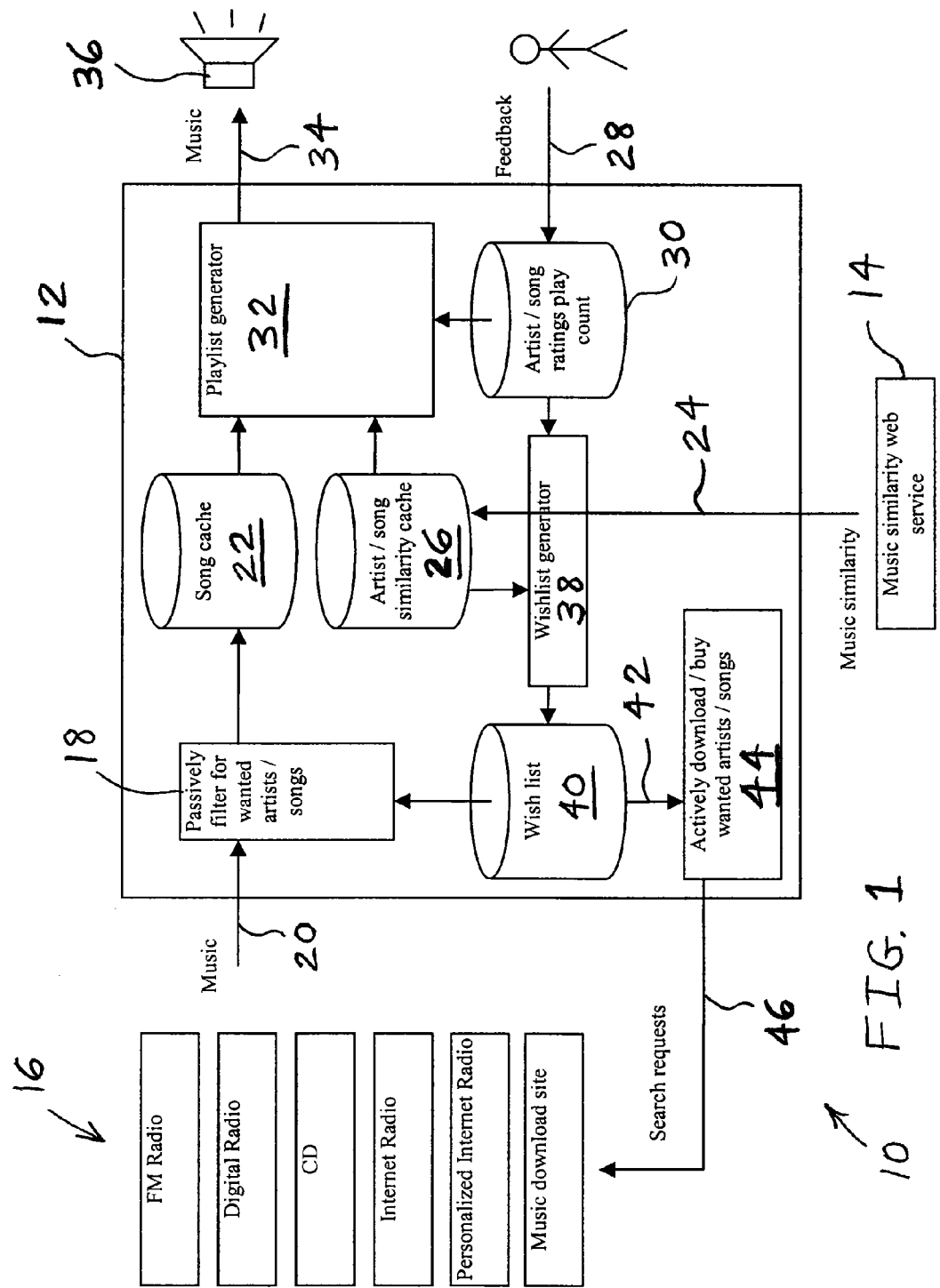
FIG. 1 is a block diagram of one embodiment of an arrangement of the present invention for making a playlist.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The invention may automatically provide the user of an entertainment system with new music without requiring his active intervention. The new music may be collected from all external sources that are currently accessible to the entertainment system.

In order to acquire new music that is of interest to the user, the music preferences of the user may need to first be detected and understood. A variety of different techniques to identify the user's preferences may be used within the scope of the invention. A first such technique is to track the user's listening behavior. This may include recording statistics of which songs and artists the user listens to and how frequently he listens to them.

A second technique may include collecting active user feedback. The system of the invention may enable the user to rate and/or rank the degree to which he likes or dislikes particular songs and/or artists. Using input buttons, the user can enter his opinion of a song that is currently playing. In addition, the entertainment system of the invention may include a user interface through which the user may directly enter his favorite artists and/or songs to thereby speed up the learning process.

A third technique may be to analyze the user's music collection. U.S. patent application Ser. No. 12/536,214, filed Aug. 5, 2009, entitled "Personalized Entertainment System," which is hereby incorporated by reference herein in its entirety, teaches how to analyze the user's music collection in order to learn what type of music the user likes to listen to.

The user's music preferences may be compared with the songs that are stored in the entertainment system. The system of the invention may find all songs that are stored in the entertainment system and that match the user's preferences and may place these songs in a "wishlist."

According to one embodiment, an attempt may be made to find songs that are similar to any of the songs in the wishlist. For this purpose, the inventive system may access music data via the internet or other external networks, such as AllMusicGuide, Last.FM, and Pandora. Compared to embedded music databases in the entertainment system, the web service based data bases may have a larger coverage and up-to-date information. For each song or artist, the inventive system may send a request to those web services for similar songs and/or artists. In response, the entertainment system may receive a list of similar or related songs and artists.

The system of the invention may store in its internal data base for later use the resulting lists of similar or related songs and artists corresponding to each respective song and/or artist. This data base may function as a knowledge cache about artist and/or song similarity. The data base may be used later to create music play lists.

In addition, the data base may be used to create a wishlist. The wishlist may include identifiers of pieces of music that might be of interest to the user but that are not currently available in the entertainment system. If one of the songs is already part of the music collection that is stored in the device, then the song is not placed in the wishlist. On the other hand, even though music of an artist is already available in the device storage, that artist, or other songs by that artist, can still be listed in the wishlist. This makes it possible to collect more music of an artist that the user likes a lot.

The user may also have the option of manually adding items to the wishlist. For example, the system may enable the user to manually enter or select songs and artists he is interested in. In addition, the user may be able to instruct the entertainment system to store a song that is currently playing on the radio. The system may use a large cache into which the immediately preceding minutes of a radio program are recorded. Normally, this buffer is sufficiently large to extract and store the complete song. But, if for some reason, such as connection interruption, for example, the song cannot be fully recorded, then the song is added into the wishlist as well. Because the song is listed in the wishlist, the song is automatically completely recorded the next time the song is played.

The system of the invention may collect new music content from all available external sources. In order to make the collection of content more targeted towards the user's interests, the system may focus on music that the user might like. In order to do so, the system may use the wishlist that was created previously.

The system of the invention may perform passive collection by filtering broadcast content. The wishlist can be used in two different ways. One of the uses of the wishlist may be as a decision tool to filter broadcast content. The inventive system may analyze the music that is currently playing on broadcast radio stations that are within reception range or on internet radio stations available to the entertainment system. If the music is believed to be of interest to the user, then the system may record the music. Alternatively, the system may record the complete radio program upfront and then, in an analysis step, decide which of the recorded content the system will keep in memory.

The analysis step may include determining the song's name, artist and other meta-information. This may be realized by using information from the Radio Data Channel (RDS) or by extracting song information which is usually transmitted on a side channel of digital broadcast radio or internet music streams. If none of that information is available, the system may utilize fingerprinting technology. This state of the art technology extracts unique characteristics from a song and makes it possible to then identify the song.

The system may compare the song with the wishlist and determine whether the song is of interest to the user. If the song or its artist is included in the wishlist, then the system may record the song. The system may use technology such as PopCatcher on popcatcher.com to precisely identify the song's start and end and then record the complete song. Alternatively, as mentioned before, the system may record the complete program into a large cache and then identify which part of the recording makes up the songs that the system would like to keep.

The system may continuously perform the music analysis on all available broadcast and streaming sources. When interesting music is played on one of the sources, the system may record the music. Because the system may have no control over the music played by the sources, this approach can be considered to be passive.

The system may use recording strategies that depend on the capabilities of the entertainment system. For example, if the system is equipped with a multi-tuner for FM radio, then the system may be able to analyze and record content from more than one station at a time, even while the user is listening to an FM station. This makes it possible to analyze and record new music from different stations in the background without the user noticing or being aware of the analysis and recording taking place. Likewise, if an internet or other external network connection has enough bandwidth, then the system can tune to several streaming radio stations at once and record their content if the content is of interest to the user. If multiple recordings are not possible, then the system may analyze and record only the currently playing broadcast radio or internet media stream.

The system of the invention may also perform active collection by finding and downloading songs. In addition to the passive approach, the system may also utilize the wishlist to actively collect music. In contrast to collecting passively, the system may use internet services or other external networks to actively find the content named in the wishlist and to download such content.

The system may use a variety of services and sources in order to find the content. A first such service/source is music download sites. The system may have knowledge of a large range of web services that offer free and legal music downloads, such as mpfree.com, redferret.net and Amazon.com. The system may check those sites for songs and artists included in the wishlist and if found, may download the songs.

A second such service/source is "Googling" for music. The system may use search engines to find free and legal music files as offered for example by Google's music search at Google.com/Music.

A third such service/source involves the use of web services to obtain notification whenever a specific song is played on a broadcast or internet radio station. An example of this technology is "RadioTracker" on radiotracker.com which monitors "Shoutcast" internet radio stations for specific artists. If the entertainment system receives a notification from the web service, then the entertainment system may tune to the radio station and record the song.

If the songs in the wishlist cannot be found otherwise, the system of the invention is also able to purchase them automatically from online stores such as Amazon or iTunes. Since this step involves spending the user's money, the system may prompt the user for approval and confirmation to proceed with the purchase. In this confirmation step, the system may display to the user a list of the songs that the system suggests purchasing. The user has the option to listen to a sample of the songs and remove songs from the list. Once the user permits the transaction, the system may buy the songs from the online store.

Content may be stored and managed within the system of the invention. After a song from the wishlist is downloaded or recorded, the song may be stored in the memory of the entertainment system. The song may be removed from the wishlist to prevent it from being recorded again. If, on the other hand, the song was recorded because of its artist being included in the wishlist, then the system may decide whether to keep the artist in the wishlist. This decision may be based on the number of songs that is locally available by this artist. The decision may also depend on the overall popularity of the artist, which may be determined from data collected from web services, and the degree to which the user likes music from this artist. The degree to which the user like music from this artist may be inferred from observing the user's listening patterns. For example, if the user listens to an artist frequently, then the system may continue to record his music. But in order to guarantee music variety, the system may collect songs for each artist only up to a predetermined percentage of the whole music collection. Upon the predetermined percentage being reached, the artist may be removed from the wishlist and the system may stop recording his music.

If the local storage device of the entertainment system is full, then the system may remove or delete some of the songs previously collected by the entertainment system in order to make more space available in the local storage device. The system may base this decision on the popularity of the songs. Songs and the identities of artists that the user listens to frequently may be stored in the storage device. Songs and the identities of artists the user rated as uninteresting or rarely or never listens to may be removed from the storage device. The system may also consider relations between songs and artists in determining candidates for removal. If the system identifies a song for removal, then the system may check the device's internal song knowledge database which contains information what songs and artists are similar to each other. Based on that knowledge, the system may also remove songs that are similar to a song that is being deleted, unless the user rated those similar songs as interesting. This approach may make it possible to remove songs even if there is little, no, or insufficient information about how the level to which the user is interested in the songs.

When identifying songs for removal, the system may also consider the cost and effort of obtaining the songs again at a later point in time. If it took the system a relatively long period of time to collect a specific song, e.g., because the song is played only rarely on the radio, then the song may be kept in storage for a longer period of time. In addition, or alternatively, if it took the system a relatively long period of time to collect a specific song, then there may need to be stronger evidence that the user is not interested in the song before the song is deleted. Conversely, if it took the system a relatively short period of time to collect a specific song, e.g., because the song is played frequently on the radio, then the song may be removed from storage earlier. In addition, or alternatively, if it took the system a relatively short period of time to collect a specific song, then there may need to be only relatively weak evidence that the user is not interested in the song before the song is deleted. More generally, the level of requirements or threshold that must be met in order to remove a song from memory may be directly related to the level of effort or difficulty involved in the system obtaining the song.

In order to make the decision about whether a song is to be kept or deleted from storage, the system may keep a statistic on how often the system encounters each song when analyzing the radio stations for the currently playing songs. Songs that were bought from online services may not be deleted if there are other songs that can be removed instead. But if there is no other good alternative to deleting a song that was bought from an online service, then the system may ask the user for permission to delete the song. Lastly, songs that have been manually placed into the device's internal storage by the user may not be removed at all, e.g., not under any circumstances. This may ensure that the user's original music collection is not removed.

The system plays on its audio speakers the music that the system has collected. Based on the system's internal data base regarding the relationships between songs, and based on the collected music which is now available in the system, the system may play music to the user by first creating playlists. Each playlist may be in the form of a sequence of songs that are put into a specific order based on a set of criteria such as the music preferences of the listener and the similarities of the individual songs. A result of the playlist generation may be to create sequences that are appealing to the user. The system may suggest music the user might like, based on the knowledge about his interests. The system may also consider which songs have recently been collected and which songs have been available in the system's memory storage for a longer period of time. Recently collected songs may be presumed to be unknown to the user. The system may use that information to provide an appealing mix of familiar music and new music that is unknown to the user. Thus, the order of the songs in the playlist may depend upon the dates and/or times at which each particular song was added to the system's memory.

In contrast, prior art approaches for suggesting music do not take into account the aspect of when and if parts of the locally-stored music were automatically collected. In addition, many of the songs included in prior art data bases are not available in the local storage. In comparison, the present invention may rely on cached information which covers songs that are actually locally available plus information regarding directly related songs. This data base of the present invention may be automatically constructed from information available on the internet or on other external networks. As a result, the database used by the invention may be only a fraction of the size of other embedded prior art databases, but may still contain all the information necessary to suggest music and create playlists.

One embodiment of an arrangement 10 of the present invention for creating a playlist is illustrated in FIG. 1. Arrangement 10 includes an entertainment system 12 in communication with a music similarity web service 14 and a plurality of external network and broadcast music sources 16. Entertainment system 12 includes a passive filter 18 that may receive music, as indicated at 20, from music sources 16. Filter 18 may filter the music for artists and songs that are wanted by the user, or that the user is interested in.

System 12 may store music that originated from external networks and broadcast sources 16. For example, musical content may be recorded into the entertainment system's local storage memory, such as song cache 22. Because songs can also be deleted from it, this storage represents a temporary storage, i.e., a song cache. For each song recorded, information 24 about similar songs may be requested from music similarity web service 14, which may include internet services or other external networks. These recommendations 24 may be stored in a local cache as well, such as artist/song similarity cache 26. In addition, system 12 may store user feedback 28 and playback statistics for each song in a third cache 30. Based on all three data bases 22, 26, 30, a playlist generator 32 creates a sequence of songs 34 that might be of interest to the user and that may be played on an audio speaker 36.

Based on inputs from artist/song similarity cache 26 and artist/song ratings play count 30, a wishlist generator 38 produces a wish list 40. In addition, the user can manually enter or select artists or songs to be included in the wish list 40. As indicated at 42, wishlist 40 may be used for active and passive collection of new music, such as to actively download/buy artists/songs that are wanted by the user, or that the user is interested in, as indicated at 44. For example, search requests 46 may be transmitted to music sources 16 requesting music that may be in wish list 40. Before system 12 buys the song, system 12 may prompt the user for a maximum price that the user is willing to pay for the item, and system 12 may complete the purchase only if the purchase price is at or below the maximum price designated by the user.

As an example of how system 12 may be used, assume that a user is on a long road trip and is currently driving through an unpopulated area. Further assume that there is no radio station within reception range that plays music that the user is interested in, and that the user does not have with him any CDs with music. In addition, assume that there is no cell phone coverage, so the user cannot use his internet connection to listen to the radio on the internet. However, system 12 may have collected a lot of music when the user was driving through the last big city. System 12 may have tuned to some music radio stations and recorded many songs that system 12 knew that the user might be interested in. System 12 may have also collected information about those songs while the internet connection was still operating. The songs may have been recorded while the user was listening to the songs, or, perhaps more frequently, the songs and information may have been silently collected in the background operation of system 12. Now, system 12 may use all the previously acquired information and the collected songs to create a playlist of songs to play on the vehicle's audio speakers.

As another example of how system 12 may be used, assume that a user likes music and is generally interested in new artists. Whenever the user likes a song on the radio, he tries to find out its name and writes down the name. At home, he downloads or buys the song and also looks up information about related music. System 12 may automate all those steps for him. For example, because of system 12, the user does not need to write down the names of songs anymore and does not need to manually download songs he likes. System 12 may perform these functions. System 12 may also record songs from the radio whenever music is played that system 12 believes that the user might be interested in. Later, when the user wants to listen to some new music, system 12 may have a large collection available for him.

Figure 2:
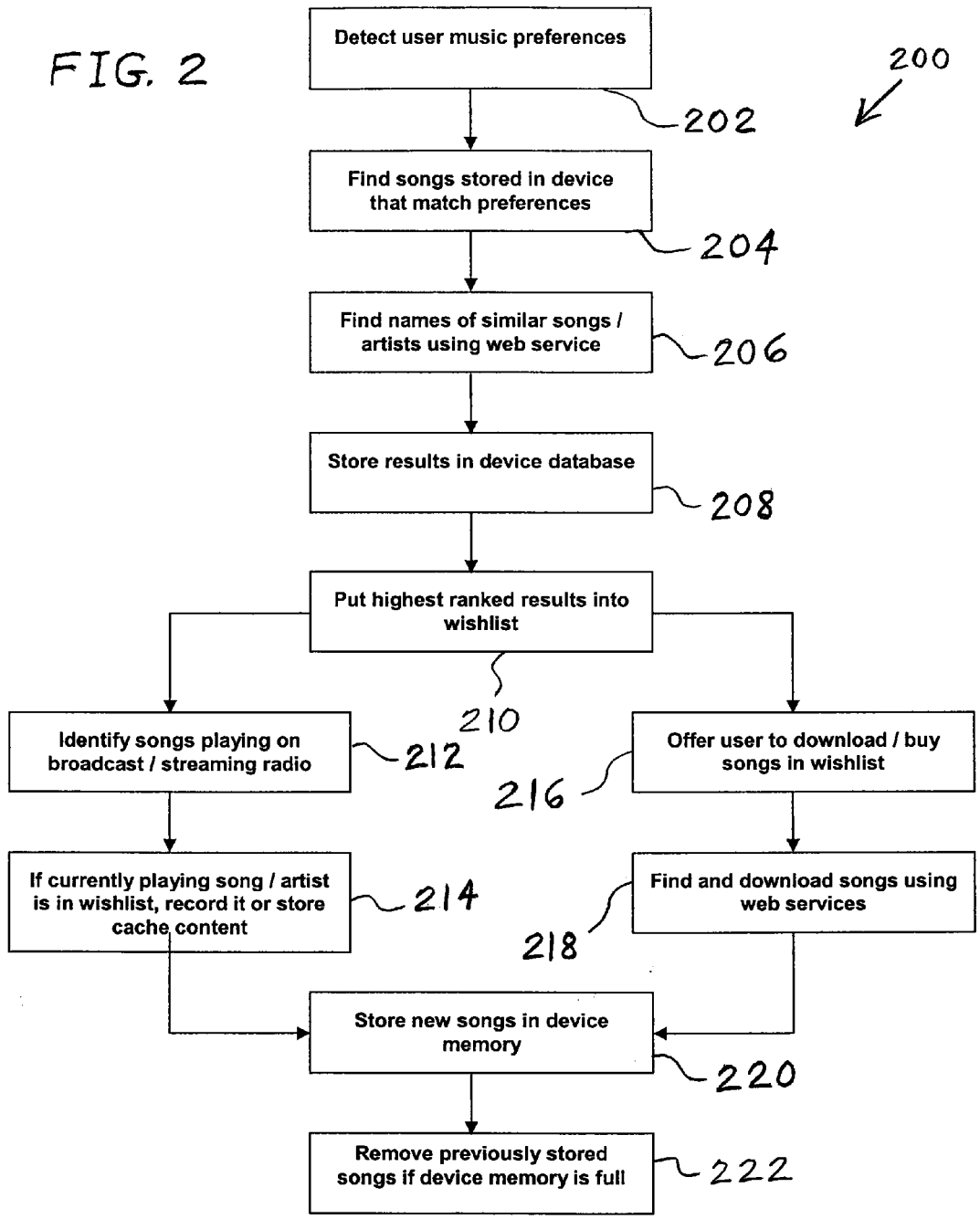
FIG. 2 is a flow chart of one embodiment of a method of the present invention for creating a playlist.

In FIG. 2 there is shown one embodiment of a method 200 of the present invention for creating a play list. In a first step 202, user preferences are detected. For example, any of the techniques disclosed in U.S. patent application Ser. No. 12/536,214, filed Aug. 5, 2009, entitled "Personalized Entertainment System," may be employed in analyzing the user's music collection in order to learn what type of music the user likes to listen to. Further, active user feedback 28 and play counts 30 may be used by wishlist generator 38 in creating a wishlist 40.

In a second step 204, songs stored in the device are found that match the user's musical preferences. Thus, all the songs that are available in the devices may be evaluated against the music preferences detected in 202 in order to find all songs that match closest with the user's music taste.

Next, in step 206, for the songs stored in the device that closest match with the music profile, names of similar songs/artists are found using a web service. For example, music similarity web service 14 may provide information and recommendations 24 regarding songs and artists that are similar to the preferences of the user.

In step 208, the results are stored in a device database. For example, songs that match the user's preferences may be stored in song cache 22, and similar songs, and the identities of artists who produce similar songs, may be stored in artist/song similarity cache 26.

In a next step 210, the highest ranked results are put into a wishlist. For example, wishlist generator 38 may populate wish list 40 with the identifiers of songs that best meet the criteria to be judged as being of the type of music that the user prefers.

Next, songs on the wishlist may be obtained by one or both of recording off of the radio and downloading off the internet. More specifically, in step 212, songs playing on broadcast/streaming radio are identified. That is via one or more tuners and/or internet connections, system 12 may capture and identify songs that are currently playing on radio. It may be possible for system 12 to identify the songs by using song-identifying information that is carried on the signals that includes the songs.

In step 214, if the currently playing song/artist is in the wishlist, then the song is recorded or stored in a cache. That is, if the identified, currently playing song matches a song identifier in the wishlist, then the song is recorded and stored in song cache 22.

Alternatively, or in addition, to steps 212, 214, system 12 may make an offer to the user to download and possibly purchase one or more songs that are in the wishlist (step 216). For example, system 12 may send audible and/or visible text messages to the user. These messages may ask the user whether he wants system 12 to buy any particular songs that may then be downloaded and stored within system 12 for later playback.

If the user indicates to system 12 that he would like to purchase one or more of the songs listed in step 216, then, in step 218, the desired songs may be found and downloaded by using web services. For example, as shown at 44, songs may be downloaded to cache 22 from a music download site that is included in music sources 16.

Regardless of whether the new songs are recorded off of the radio or downloaded, the new songs may be stored in device memory (step 220). As described above, newly acquired songs may be stored in song cache 22.

In a final step 222, previously stored songs may be removed if the device memory is full. For example, if a newly acquired song is adjudged to be of greater interest to the user than a song that is already in cache 22, and cache 22 is full, then that song that is already in cache 22 may be removed therefrom and replaced with the newly acquired song is adjudged to be of greater interest to the user.

Figure 3:
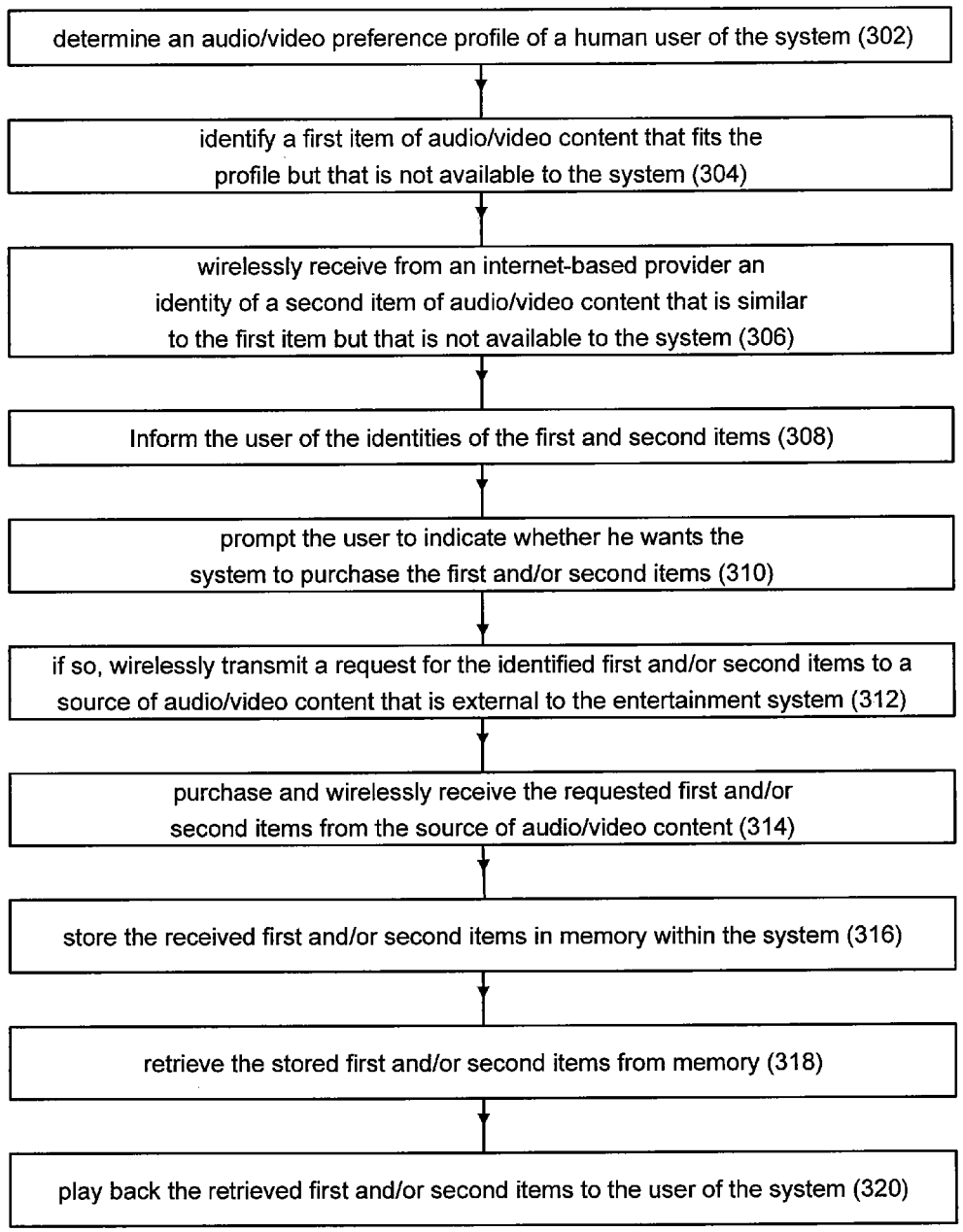
FIG. 3 is a flow chart of another embodiment of a method of the present invention for operating an entertainment system.

Another embodiment of a method 300 of the present invention for operating an entertainment system is illustrated in FIG. 3. In a first step 302, an audio/video preference profile of a human user of the system is determined. For example, any of the techniques disclosed in U.S. patent application Ser. No. 12/536,214, filed Aug. 5, 2009, entitled "Personalized Entertainment System," may be employed in analyzing the user's music collection in order to learn what type of music the user likes to listen to. Further, active user feedback 28 and play counts 30 may be used in determining what the user's preferences are.

In a second step 304, a first item of audio/video content that fits the profile but that is not available to the system is identified. For example, wishlist generator 38 may include songs in a wishlist 40 that the user listens to frequently and/or listens to all the way through when the songs are played on the radio, but which songs are not stored locally within system 12. Such songs that fit the profile may also include recent songs that the user has not even heard on the radio, but that system 12 has detected during background operation on radio stations that the user was not listening to.

Next, in step 306, an identity of a second item of audio/video content that is similar to the first item but that is not available to the system is wirelessly received from an internet-based provider. Continuing the example of the embodiment of FIG. 1, system 12 may wirelessly transmit the identity of the first item to music similarity web service 14, and service 14 may respond by sending recommendations and information 24 about a second musical item that is musically similar to the first item. The second item may be by the same artist as the first item, on the same CD as the first item, or may share a same musical style as the first item. As another possibility, service 14 may select the second item on the basis of a relatively large percentage of people who buy the first item also buying the second item.

In a next step 308, the user is informed of the identities of the first and second items. For example, the user may receive an audible and/or text message informing the user of the titles, artists, and CDs of the first and second items. It is also possible for a short audible sample of the first and second items to be played back for the user.

In step 310, the user is prompted to indicate whether he wants the system to purchase the first and/or second items. For example, the user may be asked audibly or via text messages whether he wants system 12 to wirelessly purchase the first and second items that were identified and presented to the user in step 308.

Next, in step 312, if the user indicates that he does want the system to purchase the first and/or second items, then the system wirelessly transmits a request for the identified first and/or second items to a source of audio/video content that is external to the entertainment system. That is, if the user indicates audibly or via manual inputs into a user interface that he does want the system to purchase the first and/or second items, then system 12 may wirelessly transmit a request for either or both of the first and second song items to a music download site 16 that is on the internet.

In a next step 314, the requested first and/or second items are purchased and wirelessly received from the source of audio/video content. For example, as indicated at 44, system 12 may wirelessly transmit a request for the identified first and/or second items to a music download site 16 that is on the internet. Such requested items may be received by system 12, as indicated at 20. In another embodiment, rather than purchasing the desired first and/or second items, system 12 may record the first and/or second items the next time these songs are received, as indicated at 20, via FM Radio, Digital Radio, Internet Radio, or Personalized Internet Radio. Alternatively, these songs may be recorded (e.g., copied) from a CD or other portable music storage device that is inserted into system 12 at some future time.

In step 316, the received first and/or second items are stored in memory within the system. That is, the received songs may be stored in song cache 22.

Next, in step 318, the stored first and/or second items are retrieved from memory. For example, at some future point in time, playlist generator 32 may retrieve songs from song cache 22 and include the songs in a playlist (e.g., a list of songs that are to be played back to the user wherein the songs that are selected, and the order in which the songs are played back, meets some criteria defined by the particular user's preferences as well as by other more universal criteria).

In a final step 320, the retrieved first and/or second items are played back to the user of the system. That is, the songs on the playlist from playlist generator 32 may be played back on audio speaker 36, as indicated at 34.

The invention has been described herein as pertaining primarily to identifying audio preferences of listeners and tailoring audio offerings to those preferences. However, the present invention may be equally applicable to identifying video preferences of listeners and tailoring video offerings to those preferences.

The invention has been described herein as pertaining primarily to identifying musical preferences of listeners and tailoring musical offerings to those preferences. However, the present invention may be equally applicable to identifying other types of listeners' preferred audio genres (e.g., audiobooks) and audio artists (e.g., literary authors such as Ken Follett).

The system of the invention includes several novel features. First, by observing the listening patterns (passive feedback) and/or by using active feedback, the system may identify songs and artists that are of interest to the user. The system may then check what songs are available in the system's memory to fulfill that interest. The system may also determine whether there are artists and songs that are not available in the system but that would be a good fit to the user's interests.

A second novel feature is that these new artists and songs that the user is deemed to be interested in may be placed into a "wishlist". Whenever a song that is included in a wishlist is played on the radio or on any other source available to the system, then the system may automatically record the song.

A third novel feature is that the system may actively find and download songs and artists that are in the wishlist using online music services, or the system may make an offer to the user to buy the songs from an online music retailer, e.g., iTunes or Amazon.

A fourth novel feature is that the system may, without user intervention, automatically collect music that is of interest to the user and store the music within the system. Thus, the collected and stored music can be played back at a later time when the user wants to listen to it. No internet connection may be required during playback.

A fifth novel feature is that no large and costly song knowledge data base may be required within the system. In addition, no permanent connection to the internet or other external networks may be required. The system may use internet services to identify music within the system and the relationships between songs. The relationships between songs may be stored in the device for later use without internet connection.

A sixth novel feature is that no permanent internet connection may be required for song playback. Songs may be downloaded from the internet while a connection is available and locally cached.

A seventh novel feature is that the system may be able to automatically remove some of the songs that were automatically recorded/downloaded and thus stored in the device in the event that the device memory has become full. This decision about which songs to store in memory may be based on the popularity of the songs and may also be based on the cost of re-obtaining the songs at a later point in time if needed. For example, songs that were bought from online services may be deleted only if there are no other songs that can be deleted and that can be downloaded for free. If songs were collected from free sources, the system may track how frequently the songs are played on the radio, i.e., how easy it would be to record the songs again off of the radio. Songs that have been manually stored in the device by the user may be prohibited from being removed.

An eighth novel feature is that, based on the cached song knowledge and cached song content, the system may be able to compile playlists of locally stored music. In compiling a playlist, the system may consider which songs have recently been collected and which have been available in the device's storage for a while. For example, it may be considered desirable for a playlist to include a mix of, or alternate between, newer songs and songs that have been stored within the system for a longer period of time. In one embodiment, a playlist includes a plurality of old items that have been included in a previous playlist, as well as at least one new item that has never been included in a playlist within system 12, such as items that may have been acquired in the previous twenty-four hours. Each of the new items may be immediately preceded and immediately followed by ones of the old items in the playlist.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating an entertainment system, said method comprising the computer-implemented steps of:

identifying a first item corresponding to audio or video content from a source of audio/video content, the source being external to the entertainment system;

identifying that an available space in a memory device of the entertainment system is insufficient to store the first item;

removing a second item from the memory device to generate sufficient space in the memory device for the first item, the second item being selected for removal amongst a plurality of stored items in the memory device, the selection of the second item for removal being based, at least in part, upon an expected length of time associated with re-acquiring the second item at a future time;

wirelessly receiving the first item from the source of audio/video content;

storing the first item in the memory device;

retrieving the first item from the memory device; and playing back the first item to the user.

2. The method of claim 1 comprising the further step generating an output indicating that the first item is available for playback.

3. The method of claim 1 comprising the further step of wirelessly transmitting a request for the first item to the source of audio/video content.

4. The method of claim 1 wherein the wirelessly receiving step includes downloading the first item from an internet web site.

* * * * *